United States Patent Office 3,676,081
Patented July 11, 1972

3,676,081
REMOVAL OF TITANIUM FROM MONAZITE ORES
Joseph Peter Mazza, 2497 Forest Ave.,
Niagara Falls, N.Y. 14301
No Drawing. Filed Dec. 31, 1968, Ser. No. 788,312
Int. Cl. C22b 61/04, 53/00
U.S. Cl. 23—327       11 Claims

ABSTRACT OF THE DISCLOSURE

Titanium occurring as an impurity in monazite ores is removed by treatment of a thorium chloride solution derived from said ores which contains said titanium with tannic acid to precipitate the titanium, thereby removing 90% or more of the latter.

BACKGROUND OF THE INVENTION

In recovering rare earth metals from monazite by the process disclosed in deRohden et al. U.S. Pat. No. 3,783,125, in which thorium is also recovered, difficulty has been encountered when the monazite ore which includes other minerals contains more than 0.4% titanium (calculated as $TiO_2$). The process is such that the rare earths are recovered substantially free of titanium, most of the latter being carried along into the thorium hydroxide produced when removing the rare earths as chlorides. Since for certain uses a $TiO_2$ content of not more than 200 parts per million is specified for the thorium sulfate produced from the thorium hydroxide, an effective and economical procedure for separating and removing the titanium is required.

SUMMARY OF THE INVENTION

It has now been discovered that by the addition of tannic acid to a solution of thorium chloride or a mixture of rare earth chlorides and thorium chloride which may be obtained by dissolving the respective hydroxides in hydrochloric acid, substantially all of the titanium is selectively precipitated and may be filtered off. As a result, thorium sulfate crystals containing less than 200 p.p.m. of titanium (calculated as $TiO_2$) may be obtained.

DESCRIPTION OF PREFERRED EXAMPLES

Since substantially all of the titanium is carried over into the cake of thorium hydroxide obtained by precipitation from the acid solution of the mixed rare earth hydroxides and thorium hydroxide at a controlled pH, it is possible to remove the titanium by treatment only of the thorium chloride solution which results from redissolving the separated thorium hydroxide in hydrochloric acid. In many instances this is preferred. However, in some cases, although more material must be handled, it is considered desirable to remove the titanium from the acid solution of thorium and rare earths before the separation of the latter from the thorium. This procedure is illustrated in Example 1.

EXAMPLE 1

300 g. of a cake obtained by reacting a milled monazite ore with caustic is dissolved in 304 ml. concentrated hydrochloric acid and the solution is diluted to a volume of 1 liter. The solution then contains 2.98 g./l. titanium (calculated as $TiO_2$) and has a pH of 0.4 corresponding to an HCl normality of 0.5. The solution is heated to about 80° C.–90° C. and to the hot solution is added 29.8 g./l. of tannic acid as a hot 10% aqueous solution. The mixture is then brought to the boiling point and a precipitate forms. This is filtered off and washed with a solution of $NH_4Cl$ acidified with HCl. The titanium content of the filtrate is found to be only 0.03 g./l. (calculated as $TiO_2$).

In further experiments it was found that when using a ratio of tannic acid to $TiO_2$ of 10:1 a reduction in the titanium content of the solution ranging from about 93% to over 99% was obtained. When the ratio of tannic acid to $TiO_2$ was less than 10:1 removal of titanium was less efficient, but satisfactory results were frequently obtained even with a ratio of as low as 4:1. Ratios higher than 10:1 can be used, but significantly improved results are not produced by such use.

In the following example the treatment of the thorium hydroxide remaining after recovery of the rare earths is illustrated.

EXAMPLE 2

To a 40 g. portion of thorium hydroxide obtained by filtration from a rare earth metal chloride solution is added 41 ml. of concentrated hydrochloric acid. The mixture is heated to facilitate solution and is then diluted to a volume of 1 liter, the pH being adjusted, if necessary, to about 0.4 with HCl. The solution is approximately 0.5 N with respect to the acid and contains 1.37 g./l. of titanium (calculated as $TiO_2$). 10 ml. of a hot, 10% tannic acid solution is then added and the mixture is boiled for about 10 minutes, during which time a precipitate forms. The solution is then filtered to remove the precipitate and any insoluble material contained in the thorium hydroxide and washed with a solution of $NH_4Cl$ acidified with HCl. The filtrate contains all of the thorium but only 0.13 g./l. titanium (calculated as $TiO_2$). The thorium can be recovered from the solution as thorium sulfate and converted to the oxide by well known methods. The $TiO_2$ content of the oxide thus produced is only 20 p.p.m.

A ratio of tannic acid to titanium content (calculated at $TiO_2$) as low as 1:1 may be used in the procedure of Example 2 although a longer time may be necessary to precipitate the titanium and heating of the tannic acid solution before addition to the thorium chloride solution or of the mixture after addition is usually desirable. With ratios of 10:1 precipitation of the titanium is prompt. The procedure results in a reduction of the titanium content in the thorium chloride solution of at least 90%. Although it is preferred to use an aqueous solution of the tannic acid, it may be employed as a solid if properly mixed.

In other experiments it has been found that the removal of titanium from a hydrochloric acid solution of thorium derived from monazite is most efficient when the acid concentration is from about 0.5 N to about 0.75 N, resulting in the pH of the solution ranging from 1.0 to 0 or less, although a pH of from about 0.3 to 0.75 is preferred.

The process of the present invention is advantageous in enabling the undesired titanium content of the thorium hydroxide to be removed therefrom at the same time as the impurities in the hydroxide that are insoluble in hydrochloric acid. Moreover, the treatment is such that further processing of the thorium solution to produce thorium sulfate is not adversely affected thereby.

Except as otherwise indicated, ratios and percentages referred to in this specification and the appended claims are ratios and percentages by weight.

I claim:

1. In a process for producing thorium oxide with a low titanium content from monazite having a relatively high titanium content, the improvement which comprises the steps of dissolving thorium hydroxide and the associated titanium in hydrochloric acid, adding tannic acid to the resultant solution to precipitate the titanium, and removing the precipitate from the solution.

2. A process as set forth in claim 1 in which the solution is heated after addition of the tannic acid.

3. A process as set forth in claim 1 in which the tannic acid is added in solution.

4. A process as set forth in claim 1 in which the ratio of tannic acid to titanium calculated as $TiO_2$ is from 1:1 to 10:1.

5. A process as set forth in claim 1 in which the solution of thorium hydroxide in hydrochloric acid is from about 0.5 to about 0.75 normal with respect to HCl.

6. A process as set forth in claim 1 in which the thorium hydroxide is mixed with rare earth hydroxides.

7. A process as set forth in claim 1 in which the pH of the solution of thorium hydroxide in hydrochloric acid has a pH in the range from below 0 to 1.0.

8. A process as set forth in claim 2 in which the said solution has a pH in the range from below 0 to 1.0 and in which the ratio of tannic acid to titanium calculated as $TiO_2$ is from 1:1 to 10:1.

9. A process as set forth in claim 2 in which the said solution has a pH in the range from below 0 to 1.0; the tannic acid is added in solution; and the ratio of tannic acid to titanium calculated as $TiO_2$ is from about 4:1 to 10:1.

10. A process as set forth in claim 2 in which the said solution has a pH in the range from below 0.3 to 0.75 and in which the ratio of tannic acid to titanium calculated as $TiO_2$ is from 1:1 to 10:1.

11. A process as set forth in claim 2 in which the said solution has a pH in the range from below 0.3 to 0.75; the tannic acid is added in solution; and the ratio of tannic acid to titanium calculated as $TiO_2$ is from about 4:1 to 10:1.

References Cited

UNITED STATES PATENTS

| | | | |
|---|---|---|---|
| 2,915,363 | 12/1959 | Gross | 23—318 |
| 3,029,131 | 4/1962 | Ruhoff et al. | 23—321 |
| 3,087,948 | 4/1963 | Carter et al. | 23—318 |

OTHER REFERENCES

Audsley et al., The Extraction of Thorium From Monazite, Extraction and Refining of the Rarer Metals, Stephen Austin and Sons, Inc., Caxton Hill, England, 1957, pp. 351–358.

CARL D. QUARFORTH, Primary Examiner

P. A. NELSON, Assistant Examiner

U.S. Cl. X.R.

23—202, 345

UNITED STATES PATENT OFFICE
CERTIFICATE OF CORRECTION

Patent No. 3,676,081    Dated July 11, 1972

Inventor(s) Joseph Peter Mazza

It is certified that error appears in the above-identified patent and that said Letters Patent are hereby corrected as shown below:

Column 1, lines 21-22, "3,783,125" should read -- 2,783,125 --.

Signed and sealed this 19th day of December 1972.

(SEAL)
Attest:

EDWARD M. FLETCHER, JR.           ROBERT GOTTSCHALK
Attesting Officer                 Commissioner of Patents